United States Patent
Luan

(10) Patent No.: US 7,974,190 B2
(45) Date of Patent: Jul. 5, 2011

(54) DYNAMIC QUEUE MEMORY ALLOCATION WITH FLOW CONTROL

(75) Inventor: Chung Chen Luan, Saratoga, CA (US)

(73) Assignee: Micrel, Inc., San Jose, CA (US)

( * ) Notice: Subject to any disclaimer, the term of this patent is extended or adjusted under 35 U.S.C. 154(b) by 240 days.

(21) Appl. No.: 12/369,923

(22) Filed: Feb. 12, 2009

(65) Prior Publication Data
US 2010/0202470 A1 Aug. 12, 2010

(51) Int. Cl.
- H04L 12/28 (2006.01)
- H04L 12/56 (2006.01)
- G01R 31/08 (2006.01)

(52) U.S. Cl. ........................ 370/229; 370/412
(58) Field of Classification Search .................. None
See application file for complete search history.

(56) References Cited

U.S. PATENT DOCUMENTS

| | | | |
|---|---|---|---|
| 6,762,995 B1 * | 7/2004 | Drummond-Murray et al. ............. | 370/229 |
| 7,366,802 B2 * | 4/2008 | Seto ................. | 710/52 |
| 7,733,894 B1 * | 6/2010 | Giacobbe et al. ........... | 370/415 |
| 2009/0043984 A1 * | 2/2009 | Chang et al. ............. | 711/173 |

OTHER PUBLICATIONS

"High Performance Single-Chip 10/100 Non-PCI Ethernet Controller," SMSC LAN9118 Data Sheet, pp. 1-129.

* cited by examiner

Primary Examiner — Chirag G Shah
Assistant Examiner — Srinivasa R Reddivalam
(74) Attorney, Agent, or Firm — Patent Law Group LLP; Carmen C. Cook

(57) ABSTRACT

A method in an Ethernet controller for allocating memory space in a buffer memory between a transmit queue (TXQ) and a receive queue (RXQ) includes allocating initial memory space in the buffer memory to the RXQ and the TXQ; defining a RXQ high watermark and a RXQ low watermark; receiving an ingress data frame; determining if a memory usage in the RXQ exceeds the RXQ high watermark; if the RXQ high watermark is not exceeded, storing the ingress data frame in the RXQ; if the RXQ high watermark is exceeded, determining if there are unused memory space in the TXQ; if there are no unused memory space in the TXQ, transmitting a pause frame to halt further ingress data frame; if there are unused memory space in the TXQ, allocating unused memory space in the TXQ to the RXQ; and storing the ingress data frame in the RXQ.

17 Claims, 7 Drawing Sheets

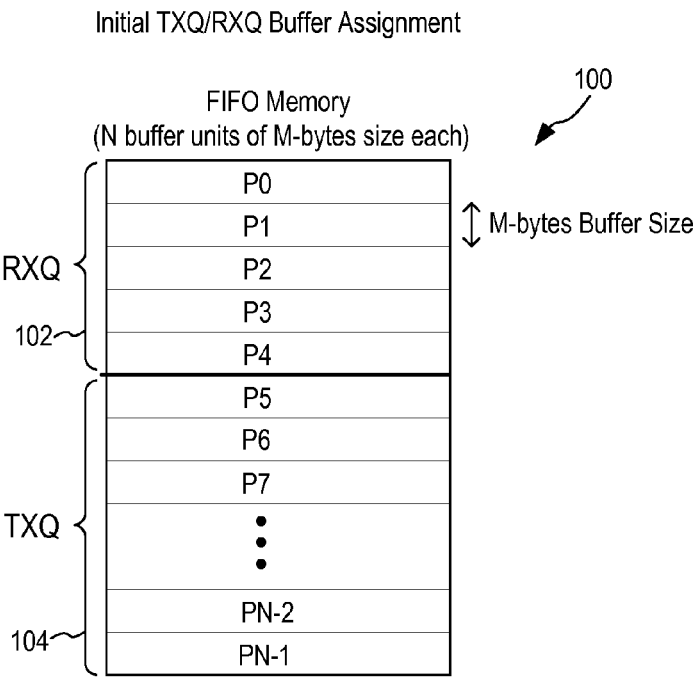
FIG. 2
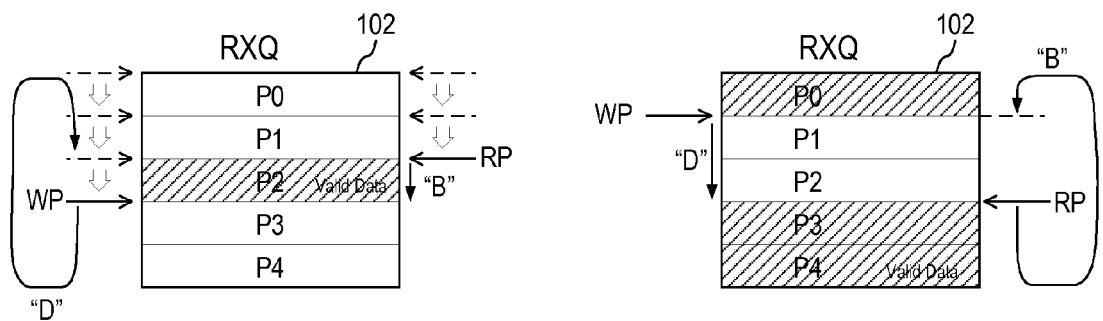
FIG. 4A  FIG. 4B

RXQ Borrow Buffer Unit from TXQ

DYNAMIC QUEUE MEMORY ALLOCATION WITH FLOW CONTROL

FIELD OF THE INVENTION

The invention relates to Ethernet controllers and, in particular, to an Ethernet controller implementing dynamic queue memory allocation.

DESCRIPTION OF THE RELATED ART

Ethernet Controllers are incorporated in networking devices to provide network communication functions. For example, cable or satellite set-top boxes or voice over IP adapters incorporate Ethernet controllers for communicating with a data network, such as a local area network (LAN) implemented under the IEEE 802.3 standards. A conventional Ethernet controller includes a buffer memory for storing the transmit and receive data. A Queue Management Unit (QMU) in the Ethernet controller manages packet traffic between the MAC/PHY interface and the host processor. In general, the buffer memory is implemented using a FIFO (first-in-first-out) memory and is divided into a receive queue (RXQ) and a transmit queue (TXQ). The buffer memory is therefore also referred to as the queue memory.

In the conventional Ethernet controllers, the memory sizes for the RXQ and the TXQ is either fixed or is configurable during set-up. Even when the memory sizes for RXQ and TXQ are configurable, the sizes become fixed after configuration and do not change during the controller operation. Therefore, conventional Ethernet controllers operate with a fixed RXQ memory size and a fixed TXQ memory size.

In operation, the Ethernet controller communicates with a link partner in the LAN over the transmission medium. The host processor transmits egress data frames to the Ethernet controller which are stored in the TXQ. The egress data frames stored in TXQ are to be transmitted onto the transmission medium through the MAC controller and the Ethernet PHY. On the other hand, the PHY and the MAC controller receive ingress data frames from the transmission medium which are stored in the RXQ. The ingress data frames are to be read or transmitted to the host processor. The flow of network traffic to and from the Ethernet controller is not always consistent or even. At times, a large number of ingress data frames may be sent to the Ethernet controller. Alternately, at times, a large number of egress data frames may becomes available for transmission.

Flooding of ingress data frames can cause the Ethernet controller to send the "Pause" frame to request the link partner to stop sending more frames until the previously received data frames in the RXQ have been processed or read out of RXQ and free space in RXQ is available for new ingress frames. The more handshakes between link partners for buffer status update, the more disruption is created in the regular data transfer. In extreme case, the deluge of ingress frames filling up the RXQ buffer will cause data frames to be discarded and requires retransmission of the dropped data frames. The Pause frames, the additional handshakes for buffer status update, and the retransmission of dropped frames all have a negative impact on the network bandwidth usage and the overall system throughput and performance are consequently degraded.

SUMMARY OF THE INVENTION

According to one embodiment of the present invention, a method in an Ethernet controller for allocating memory space in a buffer memory between a transmit queue (TXQ) and a receive queue (RXQ) includes allocating initial memory space in the buffer memory to the RXQ and the TXQ; defining a RXQ high watermark indicating high memory usage in the RXQ and a RXQ low watermark indicating low memory usage in the RXQ; receiving an ingress data frame; determining if a memory usage in the RXQ exceeds the RXQ high watermark; if the memory usage in the RXQ does not exceed the RXQ high watermark, storing the ingress data frame in the RXQ; if the memory usage in the RXQ is at or exceed the RXQ high watermark, determining if there are unused memory space in the TXQ; if there are no unused memory space in the TXQ, transmitting a pause frame to halt further ingress data frame; if there are unused memory space in the TXQ, allocating unused memory space in the TXQ to the RXQ; and storing the ingress data frame in the RXQ.

According to another aspect of the present invention, a method in an Ethernet controller for allocating memory space in a buffer memory between a transmit queue (TXQ) and a receive queue (RXQ) includes allocating initial memory space in the buffer memory to the RXQ and the TXQ; defining a TXQ high watermark indicating high memory usage in the TXQ and a TXQ low watermark indicating low memory usage in the TXQ; receiving an egress data frame; determining if a memory usage in the TXQ exceeds the TXQ high watermark; if the memory usage in the TXQ does not exceed the TXQ high watermark, storing the egress data frame in the TXQ; if the memory usage in the TXQ is at or exceed the TXQ high watermark, determining if there are unused memory space in the RXQ; if there are no unused memory space in the RXQ, halting transmission of further egress data frame; if there are unused memory space in the RXQ, allocating unused memory space in the RXQ to the TXQ; and storing the egress data frame in the TXQ.

The present invention is better understood upon consideration of the detailed description below and the accompanying drawings.

BRIEF DESCRIPTION OF THE DRAWINGS

FIG. 2 is a representative diagram illustrating the initial buffer memory assignment for the transmit queue (TXQ) and the receive queue (RXQ) in an Ethernet controller according to one embodiment of the present invention.

FIGS. 4A and 4B are representative diagrams illustrating the progression of the read logical pointer and the write logical pointer in the RXQ according to one embodiment of the present invention.

DETAILED DESCRIPTION OF THE PREFERRED EMBODIMENTS

Figure 1:
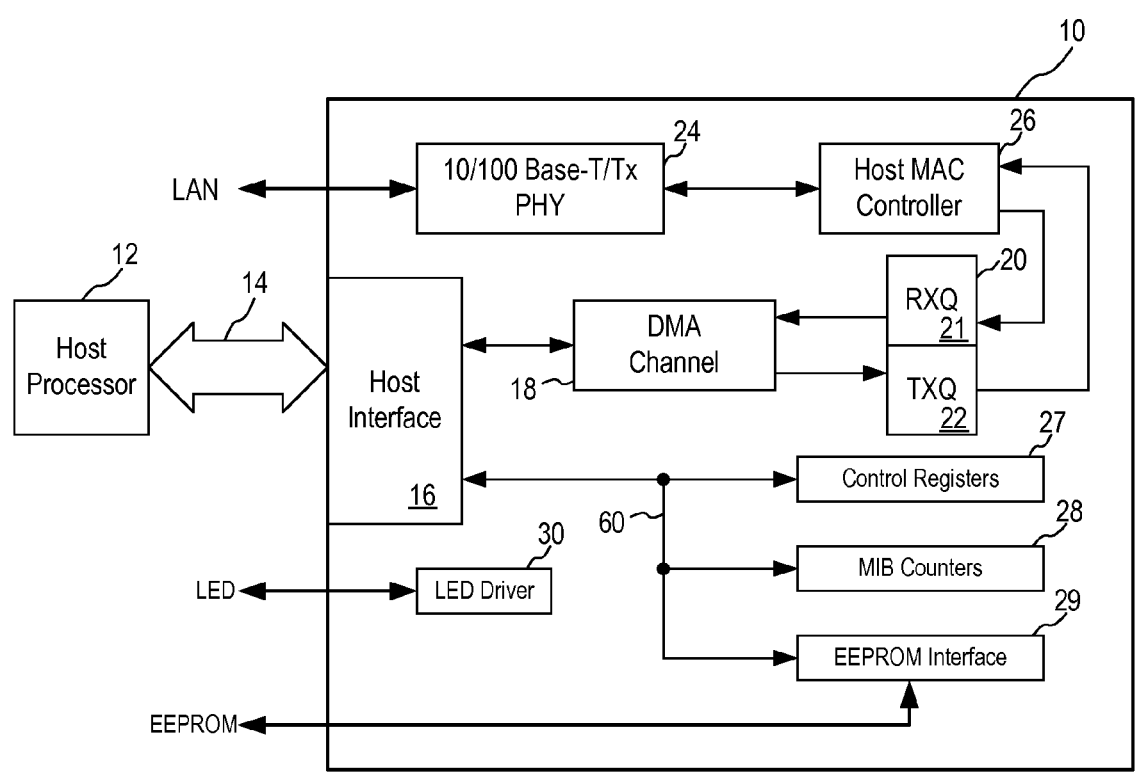
FIG. 1 is a block diagram of an Ethernet controller according to one embodiment of the present invention.

In accordance with the principles of the present invention, a dynamic queue memory allocation method is implemented in an Ethernet controller to allow the total queue memory space to be shared intelligently between the receive queue (RXQ) and the transmit queue (TXQ). The available memory space in the queue memory is dynamically allocated based on network traffic to allow either more ingress frames or more egress frames to be stored. When the additional memory space is no longer required, the dynamically allocated space is returned to the respective memory queue to ensure efficient usage of memory space.

In one embodiment, unused transmit queue (TXQ) buffers are "borrowed" or allocated to the receive queue (RXQ) to allow more ingress data frames to be received. With unused TXQ buffers available for borrowing, the receive logic, such as the Queue Management Unit, monitors the RXQ free space and borrows buffer space from TXQ to reduce the need to send Pause frames or discarding ingress data frames when the RXQ free space is about to be unavailable for receiving ingress data frames. The dynamic queue memory allocation method of the present invention also monitors the RXQ free space so that when more free space is available, or when the used space is below a certain threshold, the TXQ buffer space previously borrowed is returned to the transmit logic, such as the Queue Management Unit, in order not to affect the normal buffer requirement for frame transmissions. In this manner, the memory space in the buffer memory for the transmit queue and receive queue is dynamically allocated and not limited to a certain fixed or configurable size.

In another embodiment, unused receive queue (RXQ) buffers are "borrowed" or allocated to the transmit queue (TXQ) to allow more egress data frames to be stored for transmission. When the TXQ free space is about to be unavailable, the transmit logic borrows buffer space from RXQ to allow more egress data frames to be stored. When the TXQ free space increases to a certain level, the previously borrowed RXQ space is returned to the receive logic. With dynamical allocation of buffer memory for frames receiving or transmitting, the overall buffer memory is more efficiently used, the total RXQ/TXQ buffer required can be smaller compared to fixed size TXQ/RXQ architecture. As a result, the die size for the Ethernet controller can be made smaller and the die cost is reduced.

The dynamic queue memory allocation method of the present invention is particularly advantages for supporting receiving multiple data frames and transmitting multiple data frames. Network efficiency is improved when each data reception and transmission include multiple data frames as opposed to one frame at a time as each frame reception/transmission triggers an interrupt for the host processor. By using dynamic queue memory allocation method of the present invention, the RXQ space or the TXQ space can be dynamically increased when needed to store multiple ingress or egress data frames, thereby enabling network efficiency to be improved.

FIG. 1 is a block diagram of an Ethernet controller according to one embodiment of the present invention. Referring to FIG. 1, an Ethernet controller 10 includes a host interface block 16 for communicating with a host processor 12, a physical layer transceiver (PHY) 24 for communicating with a link partner over a physical transmission medium, and a host media access control (MAC) controller 26. For Fast Ethernet applications, the PHY block 24 is implemented as a 10/100/1000 Base-T/Tx physical layer transceiver.

Ethernet controller 10 also includes a buffer memory 20 for storing the transmit and receive data. A Queue Management Unit (QMU) in the Ethernet controller manages packet traffic between the MAC/PHY interface and the host processor. In the present illustration, the buffer memory 20 is implemented using a FIFO (first-in-first-out) memory and is divided into an initial receive queue (RXQ) portion 21 and an initial transmit queue (TXQ) portion 22. The buffer memory is also referred to as the "queue memory." To allow the host processor 12 to access the receive and transmit data stored in the receive queue and the transmit queue, Ethernet controller 10 includes a direct memory access (DMA) channel 18 whereby the host processor 12 accesses the receive and transmit data through the host interface 16 and the DMA channel 18. Finally, Ethernet controller 10 includes control registers 27 and management information base (MIB) counters 28 for storing control information. An EEPROM interface block 29 may be included to support an optional external EEPROM in some applications. Registers 27-29 communicate with host interface 16 via an internal data bus 60. Finally, Ethernet controller 10 may include an LED driver 30 for driving an LED indicator where applicable.

In operation, the Ethernet controller communicates with a link partner in the LAN over the transmission medium. The host processor transmits egress data frames to the Ethernet controller which are stored in the TXQ. The egress data frames stored in TXQ are to be transmitted onto the transmission medium through the MAC controller and the Ethernet PHY. On the other hand, the PHY and the MAC controller receive ingress data frames from the transmission medium which are stored in the RXQ. The ingress data frames are to be read or transmitted to the host processor. The flow of network traffic to and from the Ethernet controller is not always consistent or even. At times, a large number of ingress data frames may be sent to the Ethernet controller. Alternately, at times, a large number of egress data frames may becomes available for transmission. Flooding of ingress data frames can cause the Ethernet controller to send the "Pause" frame to request the link partner to stop sending more frames until the previously received data frames in the RXQ have been processed or read out of RXQ and free space in RXQ is available for new ingress frames.

FIG. 2 is a representative diagram illustrating the initial buffer memory allocation for the transmit queue (TXQ) and the receive queue (RXQ) in an Ethernet controller according to one embodiment of the present invention. Referring to FIG. 2, a buffer memory 100 is implemented as a FIFO memory. In the present embodiment, buffer memory 100 is configured as N buffer units with each buffer unit having a buffer size of M-bytes. Thus, buffer memory 100 is divided into N buffer units and each M-byte buffer unit is identified by a physical pointer (PP) from P0 to PN−1. In one embodiment, the buffer memory is a 16 KB (kilo-bytes) memory and each buffer unit has a buffer size of 1 KB. Therefore, buffer memory 100 is divided into 16 buffer units and each 1 KB buffer unit is identified by a physical pointer (PP) from P0 to P15. Other buffer memory size (N) and buffer unit size (M) can be used in other embodiments of the present invention. In an alternate embodiment, a buffer memory of N=32 buffer units with each buffer unit being 512 bytes is used. The exact size of the buffer memory and the size of the buffer unit are not critical to the practice of the present invention.

A first portion 102 of buffer memory 100 is initially allocated as the receive queue (RXQ) and a second portion 104 of buffer memory 100 is initially allocated as the transmit queue (TXQ). In the present illustration, 5 KB of buffer memory 100 is initially allocated to the RXQ and the remaining buffer memory is initially allocated to the TXQ. In operation, the memory space in buffer memory 100 is dynamically allocated between the TXQ and the RXQ to improve memory usage and improve network efficiency by reducing the need for sending the Pause frames. In the present embodiment, the dynamic queue memory allocation method allocates memory space between RXQ and TXQ in buffer unit increments. Thus, the dynamic queue memory allocation occurs at 1 KB granularity.

Figure 3:
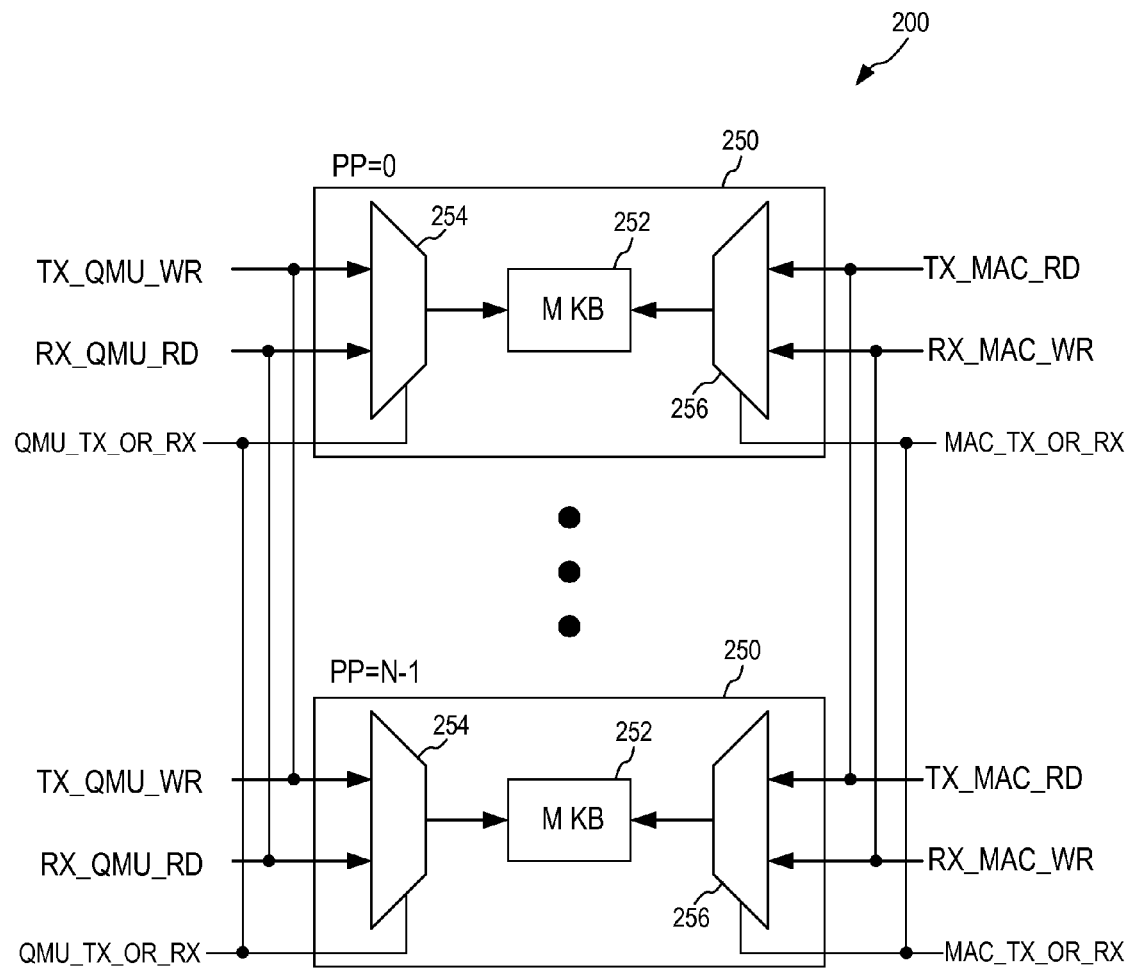
FIG. 3 is a schematic diagram of a hardware implementation of the buffer memory for RXQ and TXQ in an Ethernet controller according to one embodiment of the present invention.

FIG. 3 is a schematic diagram of a hardware implementation of the buffer memory for RXQ and TXQ in an Ethernet controller according to one embodiment of the present invention. Referring to FIG. 3, a buffer memory 200 is configured into N memory blocks 250. Each memory block 250 includes a buffer unit 252 of M bytes each. Each buffer unit 252 is associated with a physical pointer PP from 0 to N−1. Each buffer unit 252 is accessed through a pair of multiplexers 254 and 256. Each buffer unit 252 is assigned to one of TXQ or RXQ through the select signal QMC_TX_OR_RX to multiplexer 254 and the select signal MAC_TX_OR_RX to multiplexer 256. When the select signal MAC_TX_OR_RX is asserted for TX, then the specific buffer unit 252 is used for the TXQ. When the select signal MAC_TX_OR_RX is asserted for RX, then the specific buffer unit 252 is used for the RXQ.

Multiplexer 254 operates to allow the queue management unit (QMU) to access buffer unit 252. When buffer unit 252 is assigned to the TXQ, the input signal TX_QMU_WR signal is selected to allow the host processor to write egress data frames into buffer unit 252. When buffer unit 252 is assigned to the RXQ, the input signal RX_QMU_RD signal is selected to allow the host processor to read ingress data frames stored in buffer unit 252.

Multiplexer 256 operates to allow the host MAC controller to access buffer unit 252. When buffer unit 252 is assigned to the TXQ, the input signal TX_MAC_RD signal is selected to allow the MAC controller to read egress data frames from buffer unit 252. When buffer unit 252 is assigned to the RXQ, the input signal RX_MAC_WR signal is selected to allow the MAC controller to write ingress data frames into buffer unit 252.

The N memory blocks 250 in buffer memory 200 is configured so that each buffer unit can be dynamically allocated to either the TXQ or the RXQ in accordance with the dynamic memory allocation method of the present invention. More specifically, each memory block 250 is assigned to one of TXQ and RXQ by asserting or deasserting the QMU_TX_OR_RX and MAC_TX_OR_RX select signals to respective multiplexers 254 and 256.

FIGS. 4A and 4B are representative diagrams illustrating the progression of the read logical pointer and the write logical pointer in the RXQ according to one embodiment of the present invention. The progression of the read logical pointer and the write logical pointer in the TXQ operates in the same manner and will not be separately discussed. In the present description, the read logical pointer will be referred to as "RP" and the write logical pointer will be referred to as "WP". Referring to FIG. 4A, at the initial condition, both WP and RP points to the first buffer unit with physical pointer P0. The write pointer WP progresses down the buffer units as data is being written into the RXQ 102. When the host processor starts to read the valid ingress data stored in the RXQ, read pointer RP progresses down the buffer units to indicate the location of valid data that has been read. Once a buffer unit has been read, the buffer unit is released and becomes available to store new ingress data. When the WP reaches the last buffer unit (P4), the write pointer wraps around to the first buffer unit as long as the data stored therein has been read out already. The amount of buffer unit assigned to the RXQ is referred to the RXQ upper bound. In the present illustration, the RXQ upper bound is 5 as 5 buffer units have been allocated to the RXQ.

The speed of writing valid data into RXQ 102 and reading valid data out of RXQ 102 is not the same. The memory usage in the RXQ (and correspondingly, the memory usage in the TXQ) can be expressed as a distance "B" of valid data and a distance "D" of available buffer space. More specifically, the distance "B" from the read pointer (RP) to the write pointer (WP) indicates the amount of valid data stored in the RXQ that have not yet been read. The distance "D" from the write pointer (WP) to the read pointer (RP) indicates available buffer space. In the illustration in FIG. 4A, the RP is close to the WP so that the distance B is only 1 buffer unit—that is, there is only one buffer unit of valid data to be read. The available buffer space "D" is four buffer units including buffer units P3, P4 and buffer units P0 and P1 on the wrap-around. In the illustration in FIG. 4B, the RP lags behind the WP so that there are three buffer units of valid data ("B") but only two buffer units of available buffer space ("D") including buffer units P1 and P2.

In the dynamic queue memory allocation method of the present invention, a lower limit on the amount of available buffer space "D" is used to set a high watermark (HWM) of memory usage. That is, when the available buffer space "D" reaches a certain lower bound, such as less than 2 buffer units, the high watermark HWM of memory usage is reached. Furthermore, an upper limit on the amount of available buffer space "D" is used to set a low watermark (LWM) of memory usage. That is, when the available buffer space "D" reaches a certain upper bound, such as greater than 4 buffer units, the low watermark LWM of memory usage is reached. The high watermark HWM indicates that a large amount of buffer space is being used up and only few available buffer units are left. The low watermark LWM, on the other hand, indicates that a small amount of buffer space is being used and a large amount of buffer unites are available for new data to be written. In the present description, memory usage that is at or exceeds the high watermark refers to available buffer space being less than the lower limit of the available buffer space "D" and memory usage that is at or below the low watermark refers to available buffer space being greater than the upper limit of the available buffer space "D".

Under the dynamic queue memory allocation method of the present invention, when the memory usage in the RXQ reaches the RXQ HWM, if unused TXQ memory space is available, the unused TXQ memory space is "borrowed" by the RXQ at buffer unit increments (such as 1 KB). The RXQ upper bound thereby increases by the borrowed amount in 1 KB increments. When the memory usage in the RXQ drops to or below the RXQ LWM, memory space borrowed from the TXQ is returned to the TXQ and the RXQ upper bound decreases by the borrowed amount down to the initial allocation. The memory usage for the TXQ is similarly dynamically allocated with the TXQ upper bound increasing to make use of available RXQ memory space when needed and decreasing when the TXQ usage drops to or below the TXQ LWM.

Figure 5:
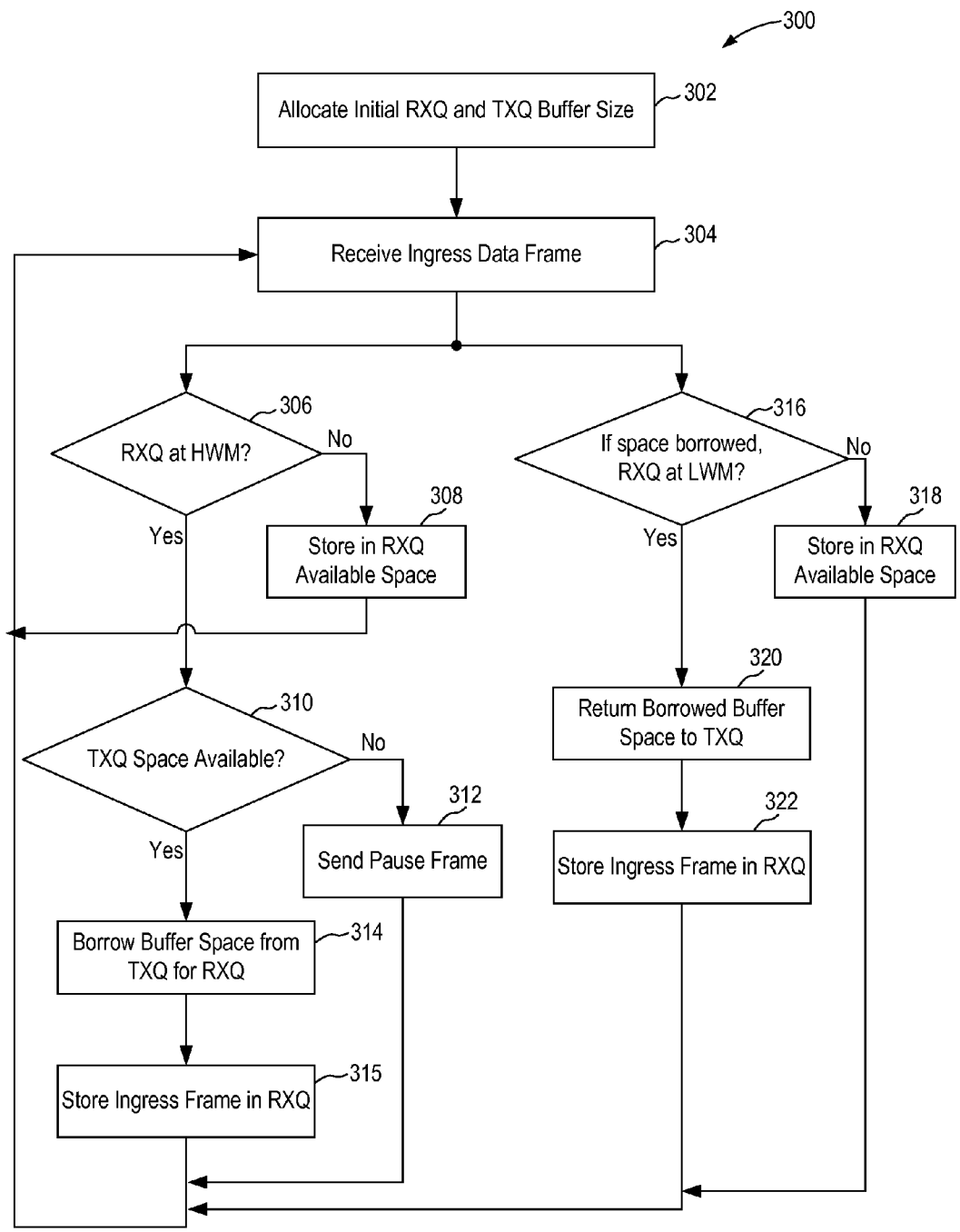
FIG. 5 is a flow chart illustrating the dynamic queue memory allocation method for an Ethernet controller according to one embodiment of the present invention for dynamically allocating the receive queue memory space.

The operation of the dynamic queue memory allocation method of the present invention for dynamically allocating RXQ memory space in an Ethernet controller will now be described with reference to the flow chart of FIG. 5. Referring to FIG. 5, at the start of method 300, initial memory allocation for the RXQ and the TXQ is made (step 302). The initial memory allocation defines the RXQ upper bound and the TXQ upper bound—the upper bound being the number of buffer units allocated to each of RXQ and TXQ. As described above, the RXQ is also defined by a high watermark RXQ HWM and a low watermark RXQ LWM. During normal network traffic flow, ingress data frames are received to be stored in the RXQ (step 304). The receive logic in the Queue Management unit checks to see if the memory usage in the RXQ is at or exceed the RXQ HWM (step 306). The distance "D" from the write pointer WP to the read pointer RP indicates the memory usage of the RXQ.

If the memory usage in the RXQ has not reached the RXQ HWM, then the ingress data frame is stored in the available space in the RXQ (step 308). If the memory usage in the RXQ has reached the RXQ HWM, then the Queue Management Unit checks to see if there is available memory space in the TXQ (step 310). If the TXQ does not have any available space, then a Pause frame is sent to halt the transmission of ingress data frames (step 312). However, if there are available space in the TXQ, then the receive logic in the Queue Management Unit will allocate the TXQ free space in buffer unit increments to the RXQ (step 314). Memory space in the TXQ is borrowed by the RXQ by increasing the RXQ upper bound by the buffer size increment. In the present embodiment, the buffer size increment is a 1 Kbytes increment. In this manner, unused TXQ buffer space is borrowed by the RXQ to allow more ingress data frames to be stored. The ingress data frame is then stored in the RXQ, such as in the borrowed memory space (step 315). Method 300 returns to step 304 to continue to receive ingress data frames.

As ingress data frames are received in the RXQ, the receive logic in the Queue Management unit also checks to see if the memory usage in the RXQ is at or below the RXQ LWM (step 316). That is, the available buffer space in the RXQ is compared to the RXQ LWM limit. If the RXQ memory usage is not at or below the RXQ LWM, then the ingress data frames will be stored in the available buffer space in the RXQ (step 318). If the RXQ memory usage is at or below the RXQ LWM, then the receive logic will return any RXQ memory space borrowed from the TXQ to the TXQ (step 320). Borrowed memory space in the RXQ is returned to the TXQ by decreasing the RXQ upper bound by the buffer size increment. Of course, if there is no TXQ borrowed space, then steps 316-320 are skipped. The ingress data frame is then stored in the RXQ as there are available unused memory space in the RXQ (step 322).

Method 300 allows the memory space in buffer memory 100 to be dynamically allocated to the RXQ so that the Ethernet controller can keep receiving ingress data frames when the initial allocation for the RXQ is almost full, thereby reducing the frequency of transmitting the Pause frame and increasing the network efficiency.

If the RXQ borrowing request (step 314) is issued in the middle of an egress data frame being written into the TXQ, method 300 includes measures to avoid the available TXQ buffer space from being used by the RXQ and TXQ at the same time. In one embodiment, the unused TXQ memory space that are available for borrowing by the RXQ is limited to those exceeding the TXQ write pointer (WP) plus a first number of buffer units, such as two buffer units, and the TXQ write pointer plus the first number of buffer units should be behind the TXQ read pointer (RP). In this manner, if the RXQ borrowing request is issued while the TXQ is not idle, a guard band for the TXQ data frames is provided to protect the egress data frames in the TXQ from being over-written.

On the other hand, if the RXQ borrowing request (step 314) is issued while the TXQ is idle, that is, while no egress data is being written into the TXQ, then the unused TXQ memory space that are available for borrowing by the RXQ is limited to those exceeding the TXQ write pointer (WP) plus a second number of buffer units, less than the first number of buffer units. Again, the TXQ WP plus the second number of buffer units should be behind the TXQ RP.

Figure 6:
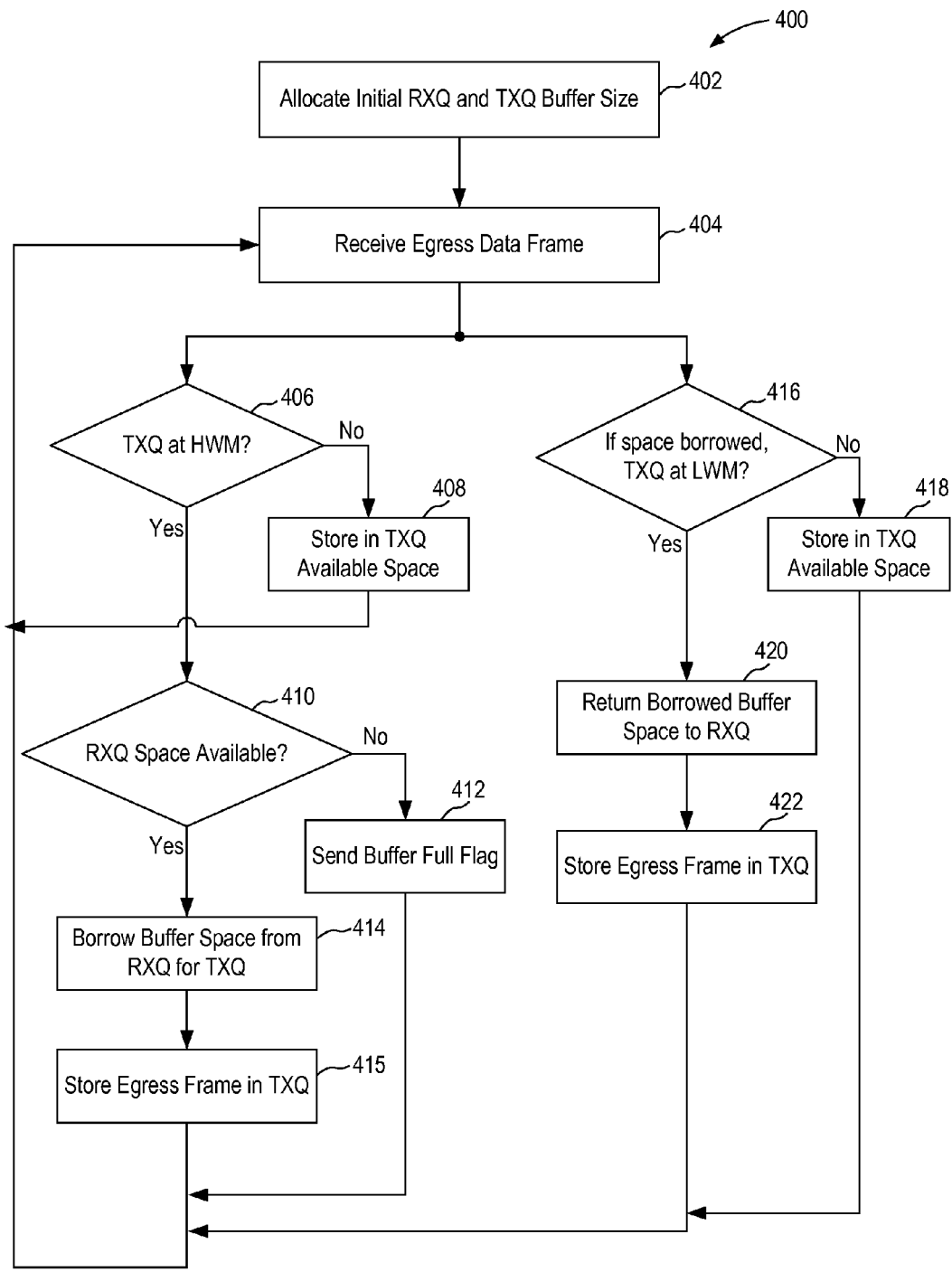
FIG. 6 is a flow chart illustrating the dynamic queue memory allocation method for an Ethernet controller according to one embodiment of the present invention for dynamically allocating the transmit queue memory space.

The above discussion concerns the dynamic allocation of the RXQ. The dynamic queue memory allocation method of the present invention can also be used to dynamically allocate the TXQ memory space by borrowing from the unused RXQ memory space. The operation of the dynamic queue memory allocation method of the present invention for dynamically allocating TXQ memory space in an Ethernet controller will be described with reference to the flow chart of FIG. 6. Referring to FIG. 6, at the start of method 400, initial memory allocation for the RXQ and the TXQ is made (step 402). The initial memory allocation defines the RXQ upper bound and the TXQ upper bound—the upper bound being the number of buffer units allocated to each of RXQ and TXQ. The TXQ is also defined by a high watermark TXQ HWM and a low watermark TXQ LWM. During normal network traffic flow, egress data frames are received to be stored in the TXQ (step 404). The transmit logic in the Queue Management unit checks to see if the memory usage in the TXQ is at or exceed the TXQ HWM (step 406). The distance "D" from the TXQ write pointer WP to the TXQ read pointer RP indicates the memory usage of the TXQ.

If the memory usage in the TXQ has not reached the TXQ HWM, then the ingress data frame is stored in the available space in the TXQ (step 408). If the memory usage in the TXQ has reached the TXQ HWM, then the Queue Management Unit checks to see if there is available memory space in the RXQ (step 410). If the RXQ does not have any available space, the host processor will be informed either by polling the TXQ or by the interrupt process that there is no more available TXQ space and the host processor will stop transmitting egress data frames. In one embodiment, method 400 transmits a buffer full flag to the host processor to inform the host processor of the buffer status (step 412). The use of the buffer full flag is optional but can be applied advantageously to provide a buffer status feedback between the Ethernet controller and the host to allow for greater efficiency.

If there are available space in the RXQ, then the transmit logic in the Queue Management Unit will allocate the RXQ free space in buffer unit increments (such as 1 KB) to the TXQ (step 414). Memory space in the RXQ is borrowed by the TXQ by increasing the TXQ upper bound by the buffer size increments. In the present embodiment, the buffer size increment is a 1 Kbytes increment. In this manner, unused RXQ buffer space is borrowed by the TXQ to allow more egress data frames to be stored. The egress data frame is then stored in the TXQ, such as in the borrowed memory space (step 415). Method 400 returns to step 404 to continue to receive egress data frames.

As egress data frames are received in the TXQ, the transmit logic in the Queue Management unit also checks to see if the memory usage in the TXQ is at or below the TXQ LWM (step 416). If the TXQ memory usage is not at or below the TXQ LWM, then the egress data frames will be stored in the available space in the TXQ (step 418). If the TXQ memory usage is at or below the TXQ LWM, then the transmit logic will return any TXQ memory space borrowed from the RXQ to the RXQ (step 420). Borrowed memory space in the TXQ is returned to the RXQ by decreasing the TXQ upper bound by the buffer size increment. Of course, if there is no RXQ borrowed space, then steps 416-420 are skipped. The egress data frame is then stored in the TXQ as there are available unused memory space in the TXQ (step 422).

Method 400 allows the memory space in buffer memory 100 to be dynamically allocated to the TXQ so that the Ethernet controller can keep receiving egress data frames when the initial allocation for the TXQ is almost full, thereby reducing the frequency of halting egress frame transmission and increasing the network efficiency.

In one embodiment, the dynamic queue memory allocation method of the present invention implements both method 300 and method 400 for dynamically allocating both the receive queue and the transmit queue depending on network traffic and usage of the respective memory queue space.

The dynamic allocation of queue memory to the RXQ and TXQ will be described in further details with reference to FIGS. 7A, 7B, 8, 9A, 9B and 10. As described above with reference to FIG. 2 and FIGS. 4A and 4B, the buffer units in the buffer memory 100 is identified by physical pointers from P0 to PN−1, N being the total number of buffer units. Specific buffer units, identified by the physical pointers, are assigned to the RXQ or TXQ. In each RXQ and TXQ, the buffer units are also associated with logical pointers, denoted L0 to LU−1, "U" being the upper bound of the respective RXQ and TXQ. The write pointer and the read pointer of each of RXQ and TXQ refer to the logical pointers in each of the RXQ and TXQ. A table for mapping the logical pointers and physical pointers for each of TXQ and RXQ is provided to allow each specific buffer unit to be selected for access either as the TXQ or the RXQ.

Figure 7A:
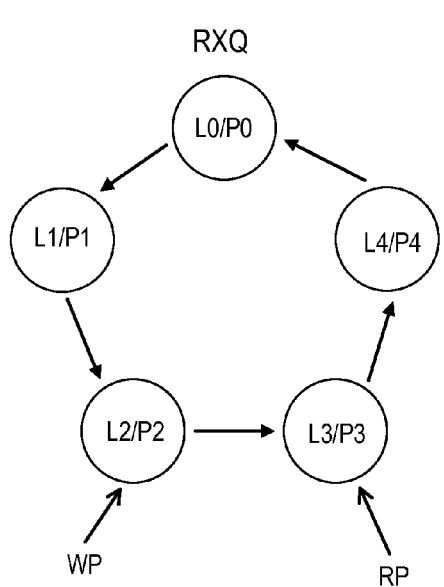
FIGS. 7A and 7B are representative diagrams of the RXQ buffer memory illustrating the addition of a buffer unit to the RXQ according to one embodiment of the present invention.
Figure 7B:
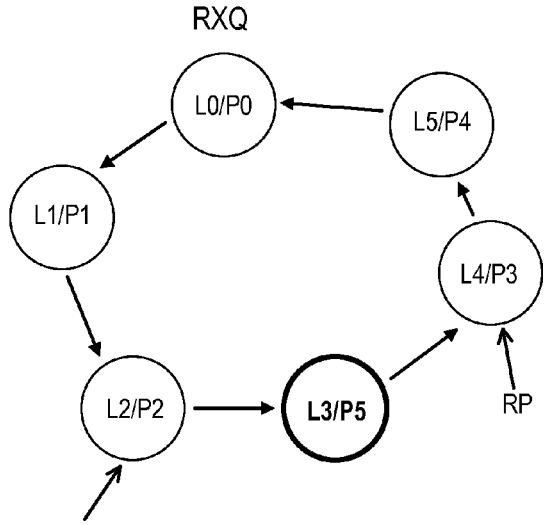
Figure 8:
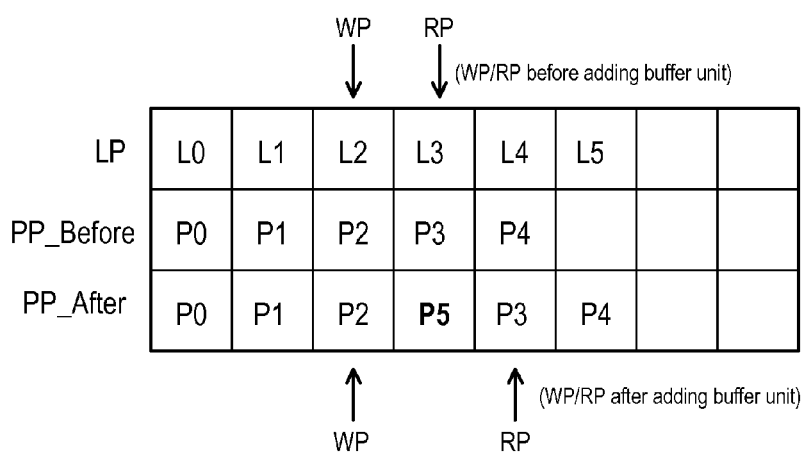
FIG. 8 is a logical pointer to physical pointer mapping table illustrating the addition of a buffer unit to the RXQ according to one embodiment of the present invention.

FIGS. 7A and 7B are representative diagrams of the RXQ buffer memory illustrating the addition of a buffer unit to the RXQ according to one embodiment of the present invention. FIG. 8 is a logical pointer to physical pointer mapping table illustrating the addition of a buffer unit to the RXQ according to one embodiment of the present invention. Referring first to FIG. 7A, in the present illustration, the RXQ is initially allocated with 5 buffer unit with physical pointers P0 to P4 and corresponding logical pointers L0 to L4. The write pointer WP has progressed through the buffer units and has wrapped around to logical pointer L2 while the read pointer RP lags behind and has only read the valid data up to logical pointer L3. The distance "D" from the WP to the RP is only 1 buffer unit and is less than the RXQ HWM (assumed to be 2 buffer units), indicating that there is very little available RXQ buffer space. The dynamic queue memory allocation method of the present invention operates to borrow available buffer space from the TXQ.

Referring to FIG. 7B, a borrowed buffer unit with physical pointer P5 is added to the RXQ. The borrowed buffer unit is added after the WP to make the buffer space immediately available for use by the WP. The logical pointers have been rearranged from L0 to L5 to account for the additional buffer unit. The borrowed buffer unit thus has a logical pointer of L3, just after the WP, and a physical pointer of P5. By dynamically allocating buffer space in accordance with the method of the present invention, the available buffer space between the WP and the RP is increased.

FIG. 8 illustrates the mapping of the physical pointers of the buffer units to the logical pointers. In the initial allocation, logical pointers L0 to L4 are sequentially mapped to physical pointers P0 to P4. When a buffer unit with physical pointer P5 is added to the RXQ, the buffer unit P5 is added to logical pointer L3, just after WP which is at L2. The mapping of physical pointers P3 and P4 are thereby shifted to logical pointers L4 and L5.

Figure 9A:
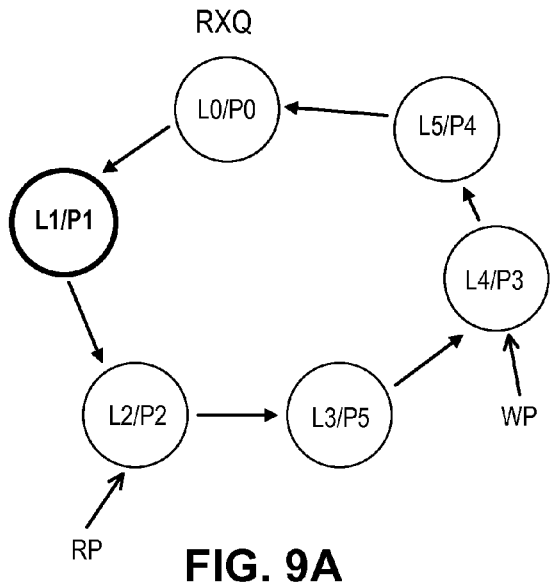
FIGS. 9A and 9B are representative diagrams of the RXQ buffer memory illustrating the removal of a borrowed buffer unit from the RXQ according to one embodiment of the present invention.
Figure 9B:
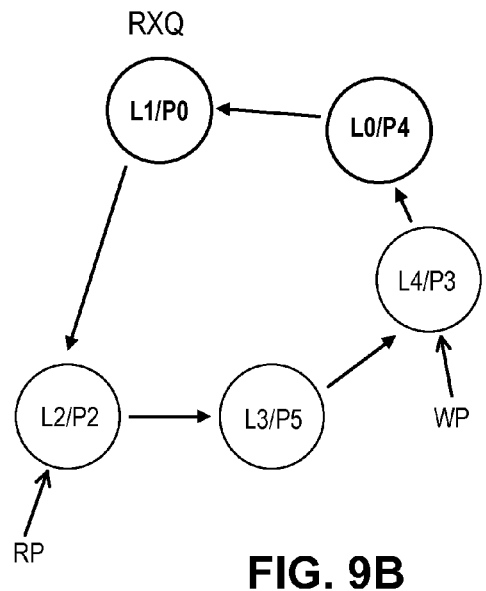
Figure 10:
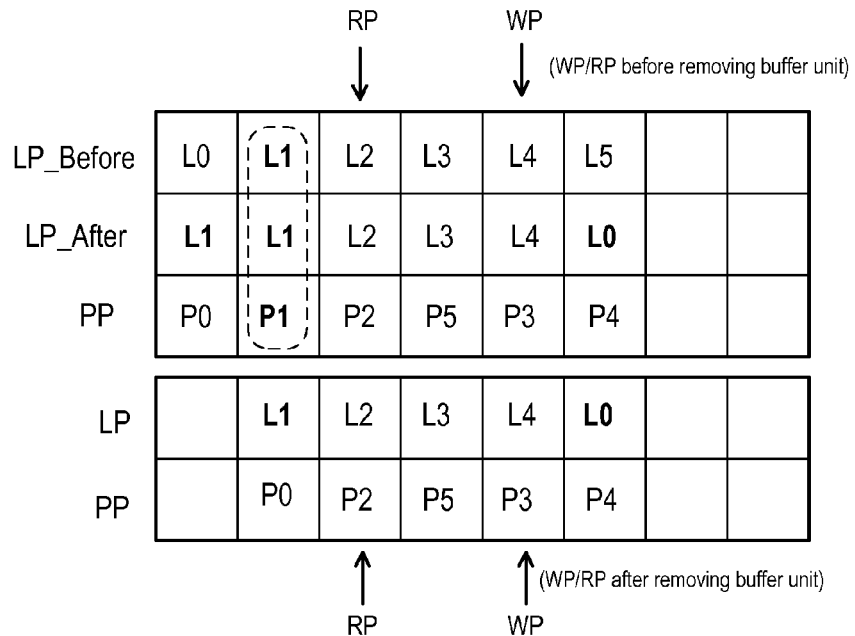
FIG. 10 is a logical pointer to physical pointer mapping table illustrating the removal of a borrowed buffer unit from the RXQ according to one embodiment of the present invention.

FIGS. 9A and 9B are representative diagrams of the RXQ buffer memory illustrating the removal of a borrowed buffer unit from the RXQ according to one embodiment of the present invention. FIG. 10 is a logical pointer to physical pointer mapping table illustrating the removal of a borrowed buffer unit from the RXQ according to one embodiment of the present invention. Referring first to FIG. 9A, the RXQ includes 6 buffer units with logical pointers from L0 to L5 mapping to corresponding physical pointers P0 to P5 not in sequential order. In the present illustration, the write pointer WP is at logical pointer L4 while the read pointer RP is at logical pointer L2. Thus, the distance "D" from the WP to the RP is large (4 buffer units) and exceeds the RXQ LWM. Therefore, the borrowed buffer space in the RXQ can be returned to the TXQ.

In FIG. 7B, the buffer unit with physical pointer P5 was borrowed from the TXQ. However, in returning the borrowed buffer unit. It is not necessary to return the same buffer unit. In accordance with one embodiment of the dynamic queue memory allocation method of the present invention, when removing borrowed buffer units, the buffer unit behind the read pointer is removed first. Thus, in the illustration in FIG. 9A, buffer unit with physical pointer P1 and logical pointer L1 will be removed and returned to the TXQ. By removing a buffer unit that is far from the write pointer and closely behind the read pointer, the available buffer space for the WP is not disturbed and data writing operation into the RXQ is not affected. Referring to FIG. 9B, after removal of the L1/P1 buffer unit, the remaining buffer units have physical pointers of P0, P2, P5, P3 and P4 and are remapped to logical pointers L1 to L4.

FIG. 10 illustrates the mapping of the physical pointers of the buffer units to the logical pointers and illustrates one method of removing a borrowed buffer unit. After identifying the L1/P1 buffer unit for removal, the mapping of the logical pointers is reassigned by starting at the logical pointer after the WP and assigning the next logical pointer to the physical pointer. Thus, logical pointer L0 is assigned to physical pointer P4. Then continuing, logical pointer L1 is assigned to physical pointer P0, logical pointer L2 is assigned to physical pointer L2 and so on. When the L1/P1 buffer unit is removed, the mapping of the logical pointer to the physical pointer of the buffer units is shown in the last two rows of the table.

The above detailed descriptions are provided to illustrate specific embodiments of the present invention and are not intended to be limiting. Numerous modifications and variations within the scope of the present invention are possible. The present invention is defined by the appended claims.

I claim:

1. A method in an Ethernet controller for allocating memory space in a buffer memory between a transmit queue (TXQ) and a receive queue (RXQ) comprising:
    allocating initial memory space in the buffer memory to the RXQ and the TXQ;
    defining a RXQ high watermark indicating high memory usage in the RXQ and a RXQ low watermark indicating low memory usage in the RXQ, wherein defining a RXQ high watermark comprises setting a minimum distance from a write pointer of the RXQ to a read pointer of the RXQ as the RXQ high watermark, and defining a RXQ low watermark comprises setting a maximum distance from the write pointer of the RXQ to the read pointer of the RXQ as the RXQ low watermark;

receiving an ingress data frame;

determining if a memory usage in the RXQ exceeds the RXQ high watermark by determining if the distance from the write pointer of the RXQ to the read pointer of the RXQ is less than the RXQ high watermark;

if the memory usage in the RXQ does not exceed the RXQ high watermark, storing the ingress data frame in the RXQ;

if the memory usage in the RXQ is at or exceed the RXQ high watermark, determining if there are unused memory space in the TXQ;

if there are no unused memory space in the TXQ, transmitting a pause frame to halt further ingress data frame;

if there are unused memory space in the TXQ, allocating unused memory space in the TXQ to the RXQ at a location after the write pointer of the RXQ; and storing the ingress data frame in the RXQ.

2. The method of claim 1, wherein:

allocating initial memory space in the buffer memory to the RXQ and the TXQ comprises allocating initial memory space in buffer units to the RXQ and TXQ; and allocating unused memory space in the TXQ to the RXQ comprises allocating unused memory space in the TXQ to the RXQ in a buffer unit increment.

3. The method of claim 2, wherein the buffer unit increment comprises 1 Kbytes.

4. The method of claim 1, wherein allocating unused memory space in the TXQ to the RXQ comprises:

determining if a write operation is being performed to the TXQ;

if a write operation is being performed to the TXQ, limiting the unused memory space to buffer units that are m buffer units away from a write pointer of the TXQ; and if a write operation is not being performed to the TXQ, limiting the unused memory space to buffer units that are n buffer units away from the write pointer of the TXQ, n being less than m.

5. The method of claim 4, wherein m buffer units comprises two buffer units and n buffer units comprises one buffer unit.

6. The method of claim 1, further comprising:

determining if a memory usage in the RXQ is at or below the RXQ low watermark;

if the memory usage in the RXQ is above the RXQ low watermark, storing the ingress data frame in the RXQ;

if the memory usage in the RXQ is at or below the RXQ low watermark, allocating borrowed memory space in the RXQ to the TXQ; and storing the ingress data frame in the RXQ.

7. The method of claim 6, wherein:

determining if a memory usage in the RXQ is at or below the RXQ low watermark comprises determining if the distance from the write pointer of the RXQ to the read pointer of the RXQ is greater than the RXQ low watermark.

8. The method of claim 7, wherein allocating borrowed memory space in the RXQ to the TXQ comprises allocating the memory space in the RXQ at a location before the read pointer of the RXQ back to the TXQ.

9. The method of claim 1, further comprising:

defining a TXQ high watermark indicating high memory usage in the TXQ and a TXQ low watermark indicating low memory usage in the TXQ;

receiving an egress data frame;

determining if a memory usage in the TXQ exceeds the TXQ high watermark;

if the memory usage in the TXQ does not exceed the TXQ high watermark, storing the egress data frame in the TXQ;

if the memory usage in the TXQ is at or exceed the TXQ high watermark, determining if there are unused memory space in the RXQ;

if there are no unused memory space in the RXQ, halting transmission of further egress data frame;

if there are unused memory space in the RXQ, allocating unused memory space in the RXQ to the TXQ; and storing the egress data frame in the TXQ.

10. The method of claim 9, wherein:

allocating initial memory space in the buffer memory to the RXQ and the TXQ comprises allocating initial memory space in buffer units to the RXQ and TXQ; and allocating unused memory space in the RXQ to the TXQ comprises allocating unused memory space in the RXQ to the TXQ in a buffer unit increment.

11. The method of claim 10, wherein the buffer unit increment comprises 1 Kbytes.

12. The method of claim 9, further comprising:

determining if a memory usage in the TXQ is at or below the TXQ low watermark;

if the memory usage in the TQ is above the TXQ low watermark, storing the egress data frame in the TXQ;

if the memory usage in the TXQ is at or below the TXQ low watermark, allocating borrowed memory space in the TXQ to the RXQ; and storing the egress data frame in the TXQ.

13. A method in an Ethernet controller for allocating memory space in a buffer memory between a transmit queue (TXQ) and a receive queue (RXQ) comprising:

allocating initial memory space in the buffer memory to the RXQ and the TXQ;

defining a TXQ high watermark indicating high memory usage in the TXQ and a TXQ low watermark indicating low memory usage in the TXQ, wherein defining a TXQ high watermark comprises setting a minimum distance from a write pointer of the TXQ to a read pointer of the TXQ as the TXQ high watermark, and defining a TXQ low watermark comprises setting a maximum distance from the write pointer of the TXQ to the read pointer of the TXQ as the TXQ low watermark;

receiving an egress data frame;

determining if a memory usage in the TXQ exceeds the TXQ high watermark by determining if the distance from the write pointer of the TXQ to the read pointer of the TXQ is less than the TXQ high watermark;

if the memory usage in the TXQ does not exceed the TXQ high watermark, storing the egress data frame in the TXQ;

if the memory usage in the TXQ is at or exceed the TXQ high watermark, determining if there are unused memory space in the RXQ;

if there are no unused memory space in the RXQ, halting transmission of further egress data frame;

if there are unused memory space in the RXQ, allocating unused memory space in the RXQ to the TXQ at a location after the write pointer of the TXQ; and storing the egress data frame in the TXQ.

14. The method of claim 13, wherein:

allocating initial memory space in the buffer memory to the RXQ and the TXQ comprises allocating initial memory space in buffer units to the RXQ and TXQ; and allocating unused memory space in the RXQ to the TXQ comprises allocating unused memory space in the RXQ to the TXQ in a buffer unit increment.

15. The method of claim 14, wherein the buffer unit increment comprises 1 Kbytes.

16. The method of claim 13, further comprising:
determining if a memory usage in the TXQ is at or below the TXQ low watermark;
if the memory usage in the TXQ is above the TXQ low watermark, storing the egress data frame in the TXQ;
if the memory usage in the TXQ is at or below the TXQ low watermark, allocating borrowed memory space in the TXQ to the RXQ; and
storing the egress data frame in the TXQ.

17. The method of claim 16, wherein:
defining a TXQ high watermark comprises setting a minimum distance from a write pointer of the TXQ to a read pointer of the TXQ as the TXQ high watermark;
defining a TXQ low watermark comprises setting a maximum distance from the write pointer of the TXQ to the read pointer of the TXQ as the TXQ low watermark; and
determining if a memory usage in the TXQ is at or below the TXQ low watermark comprises determining if the distance from the write pointer of the TXQ to the read pointer of the TXQ is greater than the TXQ low watermark.

* * * * *